(12) United States Patent
Shibano

(10) Patent No.: US 7,623,317 B2
(45) Date of Patent: Nov. 24, 2009

(54) MAGNETIC DISK DEVICE AND MAGNETIC RECORDING MEDIUM

(75) Inventor: Motomichi Shibano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/038,418

(22) Filed: Feb. 27, 2008

(65) Prior Publication Data

US 2008/0212228 A1    Sep. 4, 2008

(30) Foreign Application Priority Data

Mar. 2, 2007   (JP) .............................. 2007-053151

(51) Int. Cl.
G11B 5/596  (2006.01)
G11B 21/02  (2006.01)
G11B 5/09   (2006.01)

(52) U.S. Cl. .................. 360/77.11; 360/75; 360/48

(58) Field of Classification Search ............... None
See application file for complete search history.

(56) References Cited

U.S. PATENT DOCUMENTS 5,568,331 A    10/1996  Akagi et al.
7,019,924 B2    3/2006  McNeil et al.
2006/0274446 A1*  12/2006  Johnson et al. .......... 360/77.12
2007/0230033 A1*  10/2007  McAllister et al. ....... 360/77.12

FOREIGN PATENT DOCUMENTS

| JP | A 61-039986 | 2/1986 |
| JP | A 03-142707 | 6/1991 |
| JP | A 10-91905 | 4/1998 |
| JP | A 2003-248902 | 9/2003 |

* cited by examiner

Primary Examiner—Andrew L Sniezek
(74) Attorney, Agent, or Firm—Greer, Burns & Crain, Ltd.

(57) ABSTRACT

A magnetic disk device has a magnetic recording medium in which one servo track and an array of at least one data track are formed alternately. A head portion includes a set of reading heads arranged in a radius direction of the magnetic recording medium for reading signals from the magnetic recording medium, and a controller controls a position of the head portion based on servo signals read from the servo tracks by the reading heads disposed at opposite ends of the set of reading heads.

6 Claims, 16 Drawing Sheets

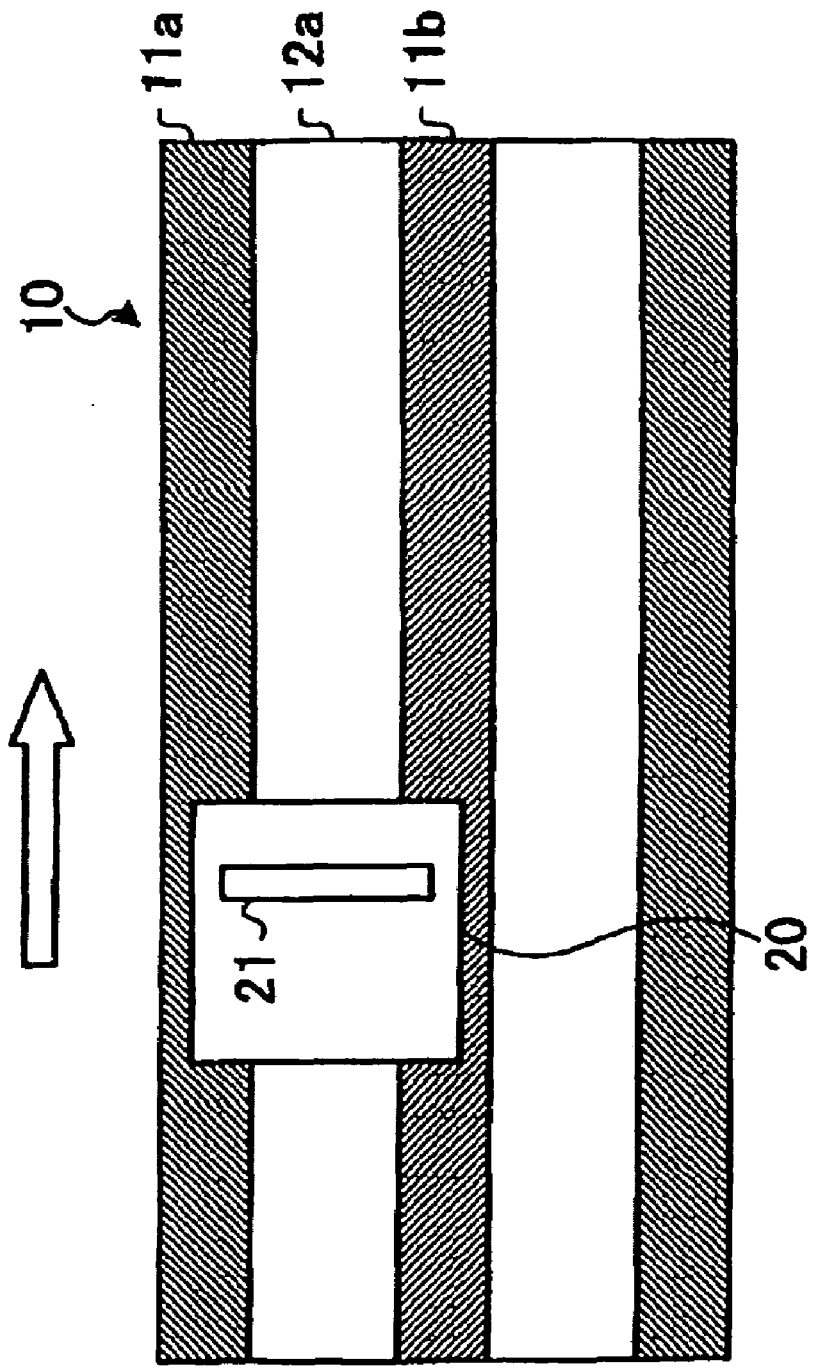

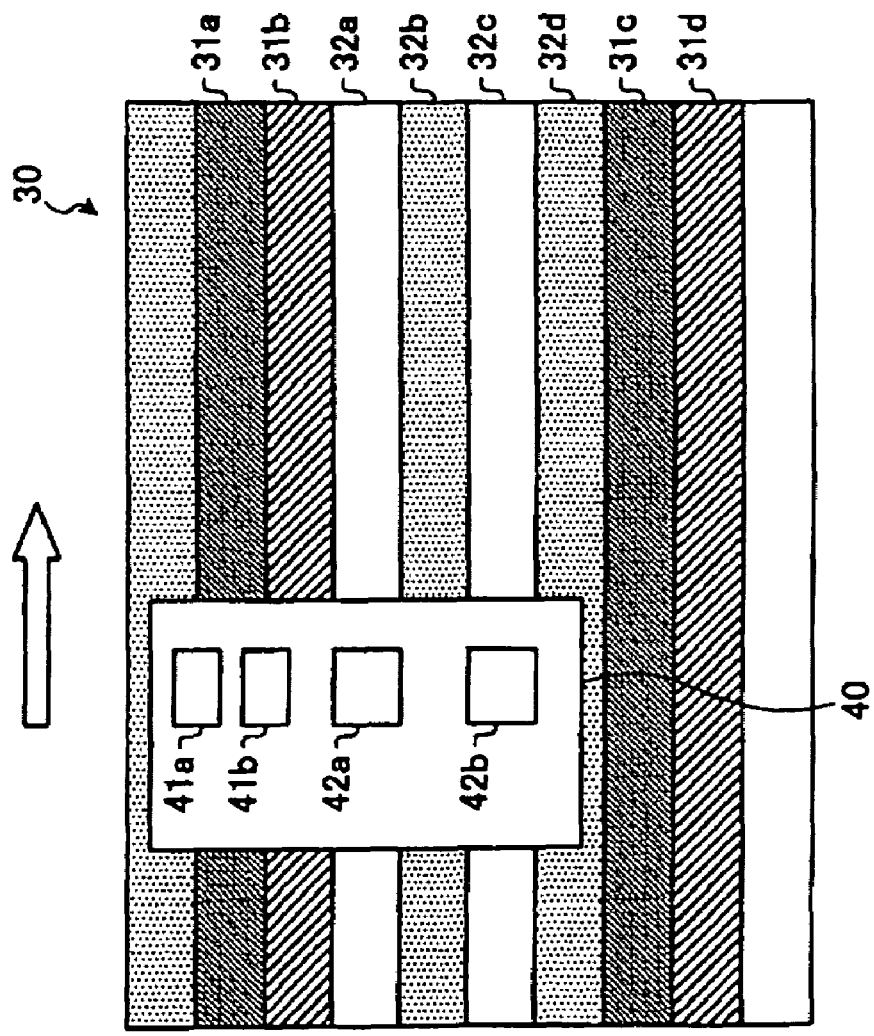

MAGNETIC DISK DEVICE AND MAGNETIC RECORDING MEDIUM

The present application describes a magnetic disk device and a magnetic recording medium. It more particularly relates to a magnetic disk device and a magnetic recording medium for inexpensively efficiently achieving stable servo control using servo tracks and increase of transmission speed due to parallel reading of data tracks.

BACKGROUND

Presently, servo control based on a sample servo system has been generally carried out in a magnetic disk device for the purpose of stably reading/writing data from/into each target track. The sample servo system is a system in which the track position of a recording/reading head is intermittently corrected based on a servo signal written in a servo frame in the head of each sector.

In the case where the sample servo system is used, the recording/reading head may be displaced from its original position due to fluctuation of the recording/reading head per se, deviation of track servo, etc. in a period from a point in time when the recording/reading head has passed through a servo frame to a point in time when the recording/reading head will pass through a next servo frame. In order to prevent the positional displacement of the recording/reading head between the servo frames from exerting influence on recording/reproducing characteristics, measures to widen the track pitch sufficiently has been hitherto taken.

Recently, demand for larger capacity of a magnetic disk device has increased, and reduction of the track pitch has been advanced in order to achieve higher density recording. Under these circumstances, the positional displacement of the recording/reading head in the sample servo system is becoming a critical problem. In order to solve this problem, it is considered that it is effective to replace the sample servo system with a servo control method using servo tracks.

The servo tracks are servo control tracks provided circumferentially in parallel with data tracks from/into which data are read/written. The track position of the recording/reading head is controlled while servo signals recorded in the servo tracks are read out. In this manner, the track position of the recording/reading head can be controlled not intermittently but consecutively to thereby effectively prevent occurrence of the positional displacement of the recording/reading head.

The servo control method using servo tracks has been disclosed, for example, in Patent Document 1 and Patent Document 2. In Patent Document 1 (Japanese Patent Laid-Open No. 91905/1998), there has been disclosed a system in which servo signals recorded in two servo tracks provided in inner and outer circumferential sides of a data track are read by one reading head to thereby perform servo control.

In Patent Document 2 (Japanese Patent Laid-Open No. 39986/1986), there has been disclosed a system in which a servo signal recorded in one servo track is read by two reading heads to thereby perform servo control, and a system in which servo information recorded in two adjacent servo tracks is read by one reading head to thereby perform servo control.

Recently, demand for higher transmission speed of a magnetic disk device as well as demand for higher capacity thereof has increased very strongly. In order to improve the transmission speed of the magnetic disk device greatly, it is a plurality of reading heads and a plurality of recording heads can be arranged in a direction of the radius of a magnetic recording medium so that data can be read/written in parallel from/into a plurality of tracks.

In the aforementioned servo control method disclosed in Patent Document 1, it is however impossible to improve the transmission speed by the provision of a plurality of reading heads because this method is based on the premise that a signal recorded in a data track and signals recorded in servo tracks in both sides of the data track are read by one reading head.

On the other hand, in the aforementioned servo control method disclosed in Patent Document 2, it is possible to provide a plurality of reading heads for reading signals from data tracks because each reading head for reading a signal from a servo track is independent of each reading head for reading a signal from a data track.

In the servo control method disclosed in Patent Document 2, the system for performing servo control by two reading heads has a problem in increase of the cost of the magnetic disk device because the system requires two reading heads for reading a servo signal in addition to reading heads for reading data signals. On the other hand, the system for performing servo control by one reading head has low efficiency because the system requires two servo tracks for every combination of data tracks from/into which data are read/written in parallel.

The invention was developed for solving the aforementioned problems of the background art. An object of the invention is to provide a magnetic disk device and a magnetic recording medium for inexpensively efficiently achieving stable servo control using servo tracks and increase of transmission speed due to parallel reading of data tracks.

SUMMARY

In accordance with an aspect of embodiments, a magnetic disk device has a magnetic recording medium in which one servo track and at least one data track are formed alternately. A head portion including a set of reading heads is arranged in a radius direction of the magnetic recording medium for reading signals from the magnetic recording medium, and a controller controls a position of the head portion based on servo signals read from the servo tracks by the outermost reading heads of the set.

In accordance with another aspect of the embodiments, a magnetic recording medium includes arrays of data tracks and servo tracks arranged alternately in a radial direction so that the tracks adjacent the innermost track and outermost track of each array are assigned as servo tracks.

DETAILED DESCRIPTION OF THE DRAWINGS

FIG. 15 shows the outline of a servo control method according to the background art; and FIG. 16 shows the outline of another servo control method according to the background art.

DETAILED DESCRIPTION

Figure 1:
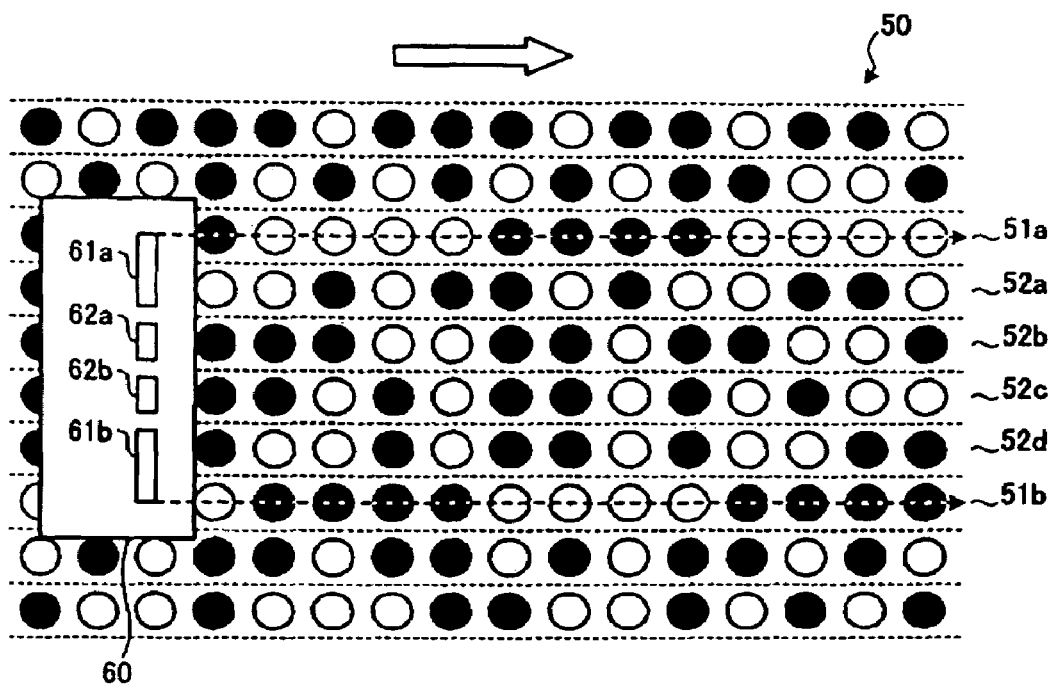
FIG. 1 shows an outline of a servo control method according to an embodiment of the present invention.

Hereinafter, preferred embodiments of a magnetic disk device and a magnetic recording medium according to the present invention will be described in detail with reference to accompanying drawings.

First, a servo control method using servo tracks according to the background art will be described briefly. FIG. 15 shows the outline of the servo control method according to the background art. As shown in FIG. 15, a data track alternates with a servo track in a magnetic recording medium 10. For example, servo tracks 11a and 11b are placed adjacently to opposite sides of a data track 12a. In FIG. 15, an arrow shows a direction of the rotation of the magnetic recording medium 10.

A head portion 20 which is configured so as to be radially movable above the magnetic recording medium 10, is provided with a reading head 21 for reading signals recorded in the magnetic recording medium 10. When it is necessary to read a data signal recorded in the data track 12a, the head portion 20 is disposed as shown in FIG. 15 so that the reading head 21 reads servo signals recorded in the servo tracks 11a and 11b in addition to the data signal recorded in the data track 12a.

Signals are recorded with different frequencies in the three tracks from which the signals are read by the reading head 21, so that the signals can be extracted individually by bandwidth separation. By comparing the extracted servo signal of the servo track 11a and the extracted servo signal of the servo track 11b with each other, displacement of the track position of the head portion 20 can be detected so that positional correction can be executed.

The servo control method according to the background art cannot be applied to the case where a plurality of reading heads are provided for increasing the transmission speed of the magnetic disk device, because the method is based on the premise that a data signal and servo signals are read by one reading head. In addition, efficiency of use of the magnetic recording medium is low because the method requires alternate provision of a data track and a servo track.

Although it may be considered that both increase in transmission speed of a magnetic disk device and improvement in efficiency of use of a magnetic recording medium can be achieved when a plurality of data tracks are provided between servo tracks and signals recorded in these data tracks are read by one reading head, this consideration is not practical because complicated signal processing is required for identifying the signal recorded in each of the tracks.

FIG. 16 shows the outline of another servo control method according to the background art. As shown in FIG. 16, arrays of four data tracks alternate with arrays of two servo tracks in a magnetic recording medium 30. For example, servo tracks 31a and 31b are placed adjacent to a combination of data tracks 32a to 32d. The servo track 31a is a servo track which is used in reading/writing from/into the data tracks 32a and 32c. The servo track 31b is a servo track which is used in reading/writing from/into the data tracks 32b and 32d.

A head portion 40 which is configured so as to be radially movable above the magnetic recording medium 30, has reading heads 41a and 41b for reading a servo signal recorded in the magnetic recording medium 30, and reading heads 42a and 42b for reading data signals. When it is necessary to read data signals recorded in the data tracks 32a and 32c, the head portion 40 is disposed as shown in FIG. 16 so that the reading heads 41a and 41b read a servo signal recorded in the servo track 31a.

On this condition, by comparing the servo signal read from the reading head 41a with the servo signal read from the reproduction head 41b, displacement of the track position of the head portion 40 can be detected so that positional correction can be executed. The data signals recorded in the data tracks 32a and 32c are read in parallel by the reading heads 42a and 42b.

When it is necessary to read data signals recorded in the data tracks 32b and 32d, the head portion 40 is disposed in such a position that the reading heads 41a and 41b can read a servo signal recorded in the servo track 31b, so that the data signals recorded in the data tracks 32b and 32d are read in parallel by the reading heads 42a and 42b.

In this manner, in the servo control method according to the background art, signals are read in parallel from a plurality of data tracks by a plurality of reading heads to thereby make it possible to increase the transmission speed of a magnetic disk device. In this method, however, two reading heads, i.e. the reading heads 41a and 41b, are required for reading a servo signal. This causes structural complication of the head portion 40 and cost increase.

Next, a servo control method according to an embodiment of the present invention will be described. FIG. 1 shows the outline of the servo control method according to the embodiment. Although FIG. 1 shows the case where a magnetic recording medium 50 is a patterned medium by way of example, the servo control method according to the embodiment is also applicable to any other medium than the patterned medium. The patterned medium is a recording medium in which magnetic domain particles are isolated each bit so that information can be recorded stably with high density.

As shown in FIG. 1, four data tracks alternate with one servo track in the magnetic recording medium 50. For example, servo tracks 51a and 51b are placed adjacent to an array of data tracks 52a to 52d. Incidentally, tracks disposed in the outermost and innermost circumferences of the magnetic recording medium 50 are servo tracks.

A head portion 60 which is configured so as to be radially movable above the magnetic recording medium 50, has reading heads 62a and 62b for reading data signals recorded in the magnetic recording medium 50, and reading heads 61a and 61b for reading both servo signals and data signals. The set of the reading heads 61a, 62a, 62b and 61b is disposed in a direction of the radius of the magnetic recording medium 50 so that signals can be read simultaneously. The reading heads 61a and 61b are located in the outermost opposite end portions of the array. The pitch between the reading heads 61a and 61b is shorter than the pitch between the servo tracks 51a and 51b.

Signals with lower frequencies than the frequency of the signal recorded in each data track are recorded in servo tracks such as the servo track 51a, so that signals read by the reading heads 61a and 61b can be separated into servo signals and data signals by bandwidth. For example, in the case where a data signal encoded so as to prohibit 0 or 1 from repeating three or more times consecutively is recorded in each data track, a low-frequency signal can be recorded in each servo track in advance in such a manner that at least four 0's and at least four 1's are written alternately in the servo track.

If low-frequency signals can be recorded in servo tracks such as the servo track 51a, it is unnecessary to record information with high density in the servo tracks. For this reason, even if the magnetic recording medium 50 is a patterned medium, each servo track can be formed as a continuous magnetic film as in the background art without the necessity of forming independent magnetic domain particles for each bit.

When it is necessary to read data signals recorded in the data tracks 52a to 52d, the head portion 60 is disposed as shown in FIG. 1 so that the reading head 61a reads a servo signal recorded in the servo track 51a and a data signal recorded in the data track 52a whereas the reading head 61b reads a servo signal recorded in the servo track 51b and a data signal recorded in the data track 52d.

On this condition, the servo signals are extracted by bandwidth separation from the signals read from the reading head 61a and the signals read from the reading head 61b. By comparing the servo signals with each other, displacement of the track position of the head portion 60 can be detected, so that positional correction can be executed. On the other hand; data signals recorded in the data tracks 52b and 52c are read in parallel by the reading heads 62a and 62b. The data signals recorded in the data tracks 52a and 52d are acquired by bandwidth separation from the signals read from the reading head 61a and the signals read from the reading head 61b.

In this manner, in the servo control method according to the embodiment, signals are read in parallel from a plurality of data tracks by a plurality of reading heads to thereby make it possible to increase the transmission speed of a magnetic disk device. Since reading heads dedicated for reading servo signals are not required, the structure of the head portion 60 can be relatively simplified to thereby suppress cost increase.

In the servo control method according to the embodiment, servo control can be performed in such a simple manner that one servo track is provided between combinations of data tracks from/into which data are read/written simultaneously. Therefore, efficiency of use of a magnetic recording medium is also high.

Although FIG. 1 shows an example in which one servo track is provided every four data tracks, it is easy to increase the number of data tracks from/into which data are read/written simultaneously because, as described above, the structure of the head portion 60 can be relatively simplified in the servo control method according to the embodiment. For example, if one servo track is provided every six data tracks, efficiency of use of a magnetic recording medium can be further improved and the transmission speed of a magnetic disk device can be also further increased.

In the servo control method according to the embodiment, two reading heads for reading servo signals of servo tracks are disposed in such a positional relation that the effective sensitivity region of one of the reading heads covers from an inner circumferential end of one of the servo tracks to the center of the one servo track while the effective sensitivity region of the other reading head covers from an outer circumferential end of the other servo track to the center of the other servo track.

For example, in the example of FIG. 1, when the direction from the servo track 51b to the servo track 51a is assumed to be an outer circumferential direction, the effective sensitivity region of the reading head 61a covers from the inner circumferential end of the servo track 51a to the center of the servo track 51a whereas the effective sensitivity region of the reading head 61b covers from the outer circumferential end of the servo track 51b to the center of the servo track 51b.

On this condition, the reading head 61a reads a signal with intensity which is a half of the full intensity of the signal recorded in the servo track 51a whereas the reading head 61b reads a signal with intensity which is a half of the full intensity of the signal recorded in the servo track 51b.

As the head portion 60 is displaced toward the outer circumferential side, the intensity of the signal read by the reading head 61a becomes larger while the intensity of the signal read by the reading head 61b becomes smaller. As the head portion 60 is displaced toward the inner circumferential side, the intensity of the signal read by the reading head 61a becomes smaller while the intensity of the signal read by the reading head 61b becomes larger.

When two reading heads for reading servo signals of servo tracks are disposed as described above, the direction and quantity of displacement of the head portion 60 can be detected based on the intensities of the servo signals read by the two reading heads.

In the servo control method using two servo tracks according to the background art, generally, servo signals are recorded with different frequencies in the servo tracks 51a and 51b in order to identify the direction of displacement of the head portion 60. When the reading heads are disposed as described above and displacement of the head portion 60 is detected based on the intensities of the servo signals, frequencies of servo signals recorded in all the servo tracks can be made the same.

Figure 2:
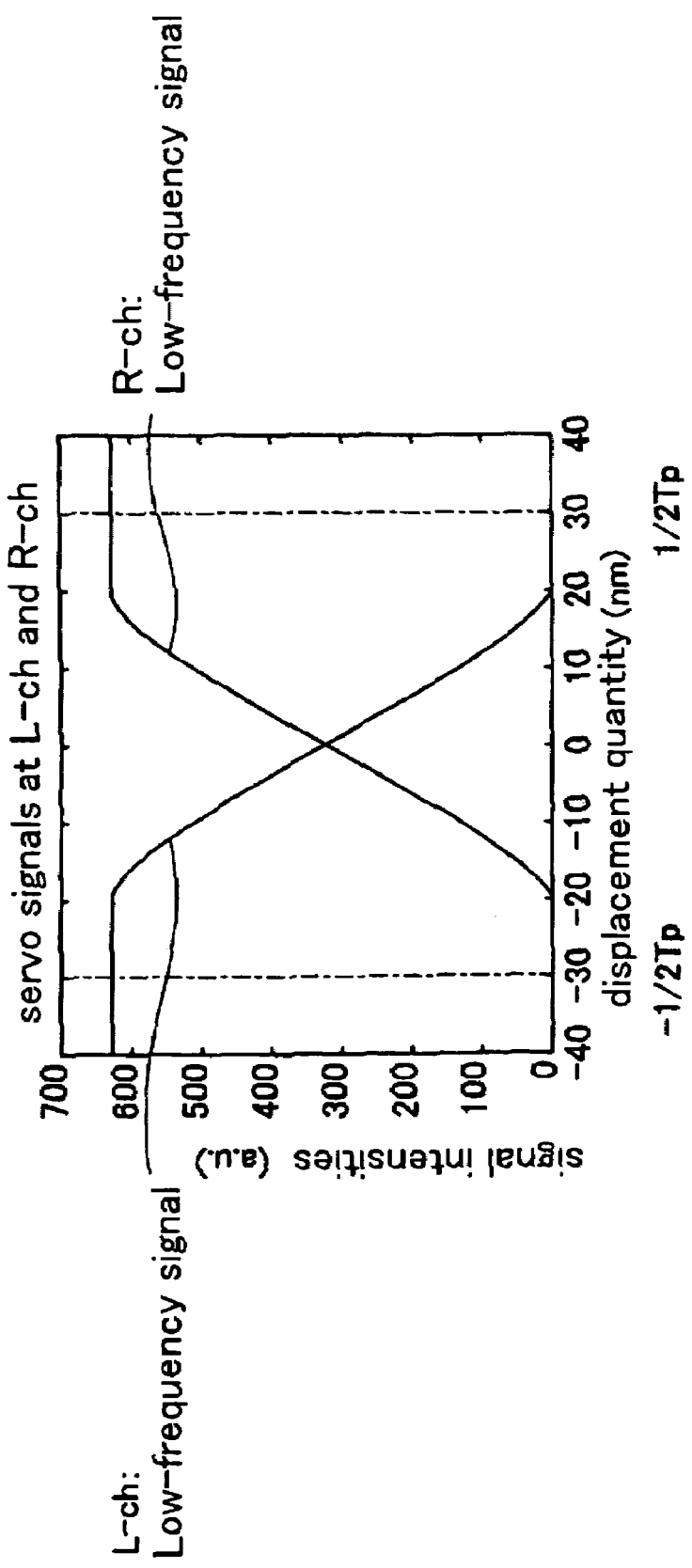
FIG. 2 shows correspondence between the displacement quantity of a head and signal intensities.

FIG. 2 shows an example of correspondence between the displacement quantity of the head portion 60 and the signal intensities of servo signals read by the reading heads 61a and 61b. FIG. 2 shows an example of the case where the servo signal read by the reading head 61a is regarded as R-ch, the servo signal read by the reading head 61b is regarded as L-ch, the radius of each magnetic domain particle is 20 nm, the pitch between magnetic domain particles is 20 nm, and the track pitch (Tp) is 60 nm.

Assume that the maximum value of the signal intensity of L-ch is equal to the maximum value of the signal intensity of R-ch as shown in FIG. 2. When the displacement quantity of the head portion 60 is 0 nm on the assumption, the signal intensity of L-ch and the signal intensity of R-ch are a half of the maximum value and equal in value to each other. As the displacement quantity of the head portion 60 increases, one of the signal intensities of L-ch and R-ch becomes larger while the other signal intensity becomes smaller.

Figure 3:
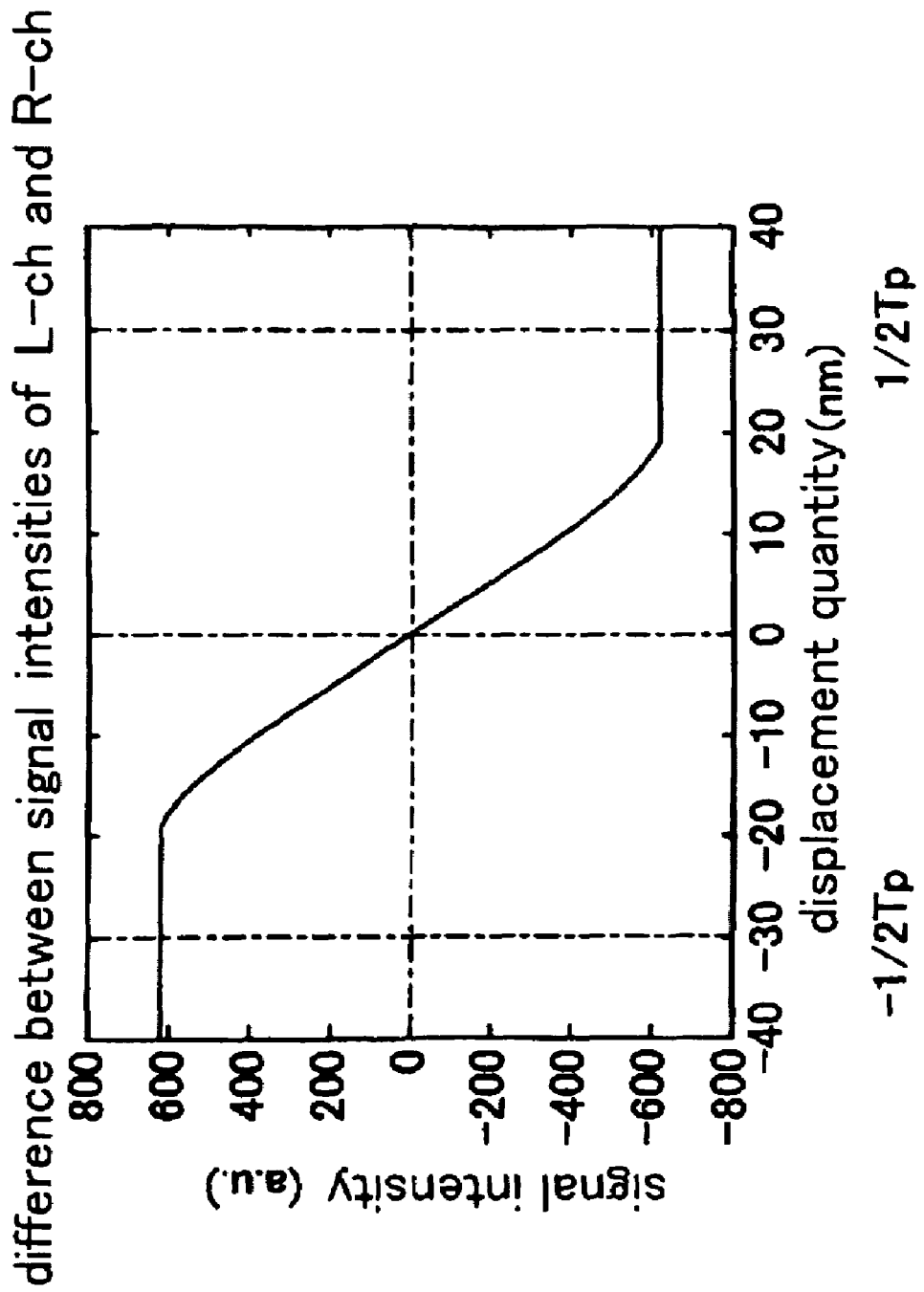
FIG. 3 shows correspondence between the displacement quantity of the head and a signal intensity difference.

Accordingly, a difference between the signal intensity of L-ch and the signal intensity of R-ch is obtained as follows. That is, as shown in FIG. 3, the difference is 0 in the case where the displacement quantity of the head portion 60 is 0 nm. The difference becomes larger in a positive or negative direction as the displacement quantity of the head portion 60 increases. In the servo control method according to the embodiment, the relation is used to control the position of the head portion 60 to make the difference between the signal intensity of L-ch and the signal intensity of R-ch 0, so that servo control is realized.

This system can be realized by a simple circuit. In addition, even when the head portion 60 is displaced slightly, a difference between the intensities of servo signals will not be 0. Accordingly, positioning can be performed with high accuracy. Since servo signals can be recorded with the same frequency in all servo tracks in advance, initialization of the servo tracks can be carried out easily.

Similarly to the servo control method according to the embodiment, the servo control method according to the background art as shown in FIG. 16 has a feature that servo signals can be recorded with the same frequency in all servo tracks because displacement of the head portion is detected based on servo signals read from one servo track. However, the servo control method according to the embodiment has an advantage of a wider displacement adjusting width than the servo control method according to the background art as shown in FIG. 16.

Figure 4:
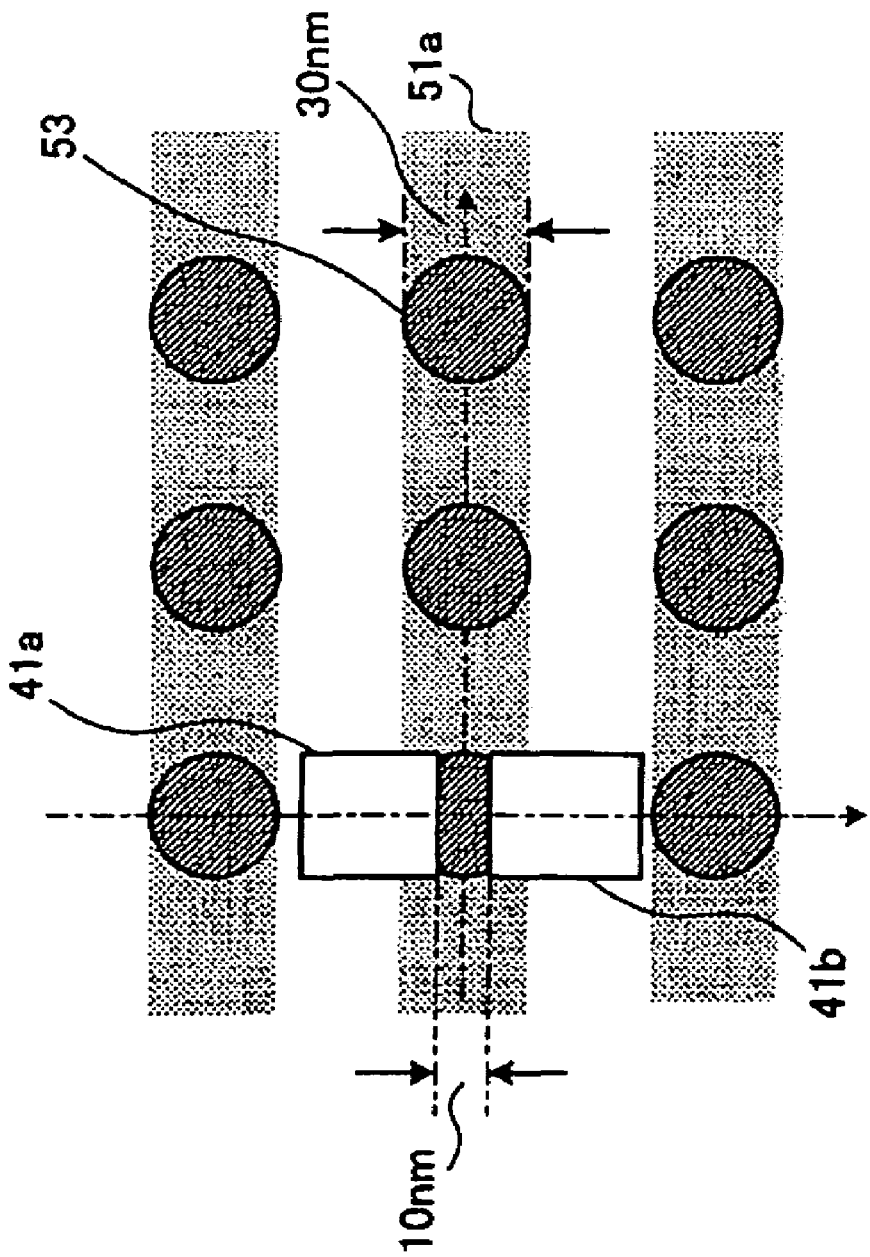
FIG. 4 shows an example of locations of reading heads in the case where a servo control method according to the background art is used.
Figure 5:
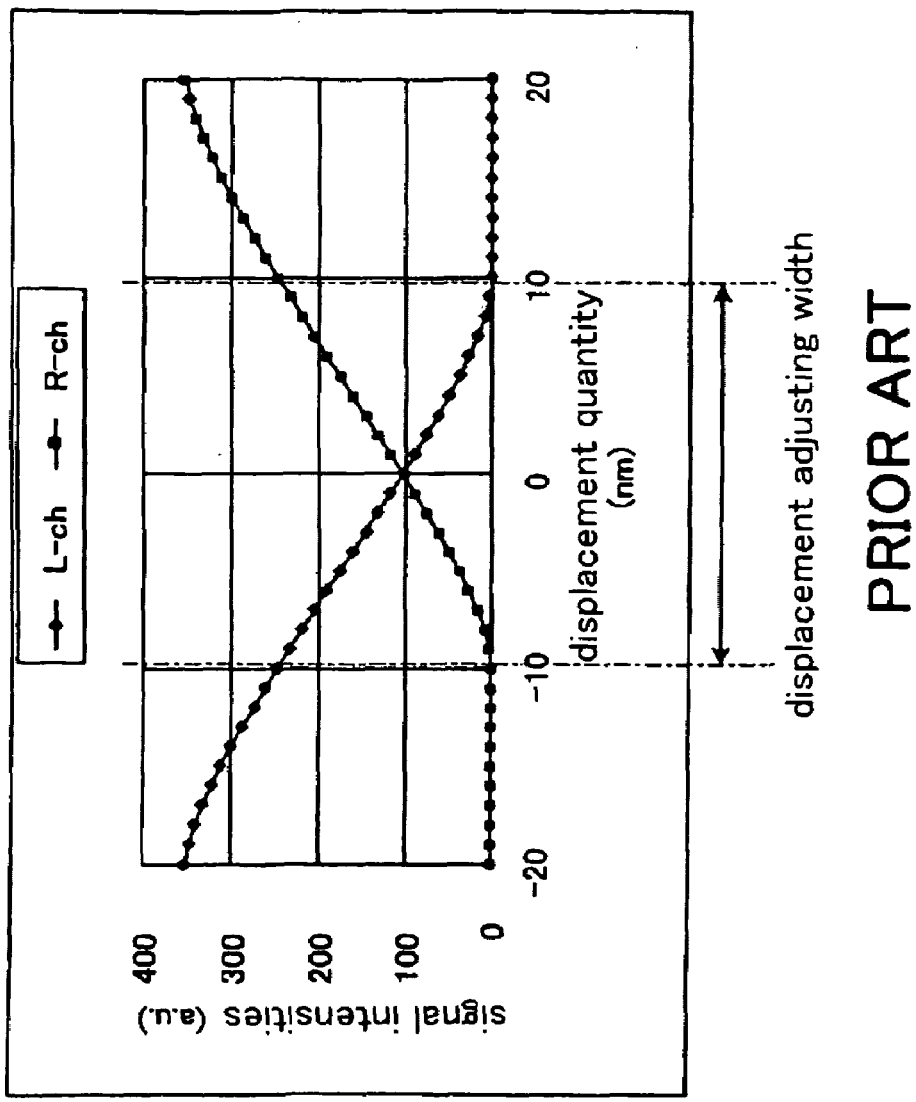
FIG. 5 shows a displacement adjusting width in the case where the servo control method according to the background art is used.

FIG. 4 shows an example in which the servo control method according to the background art as shown in FIG. 16 is applied to a magnetic disk device having a patterned medium. In this example, the diameter of each magnetic domain particle 53 is set to be 30 nm, and the distance between reading heads 41a and 41b for reading a servo signal from a servo track 51a is set to be 10 nm. In this case, as the displacement quantity of a head portion is larger than 10 nm as shown in FIG. 5, one of the reading heads 41a and 41b is displaced from the servo track 51a so as to make it impossible to read the servo signal. Thus, the displacement adjusting width is ±10 nm. Although the displacement adjusting width can be widened when the distance between the reading heads 41a and 41b is reduced, it is however extremely difficult to manufacture a head portion 60 with a smaller distance between the reading heads.

Figure 6:
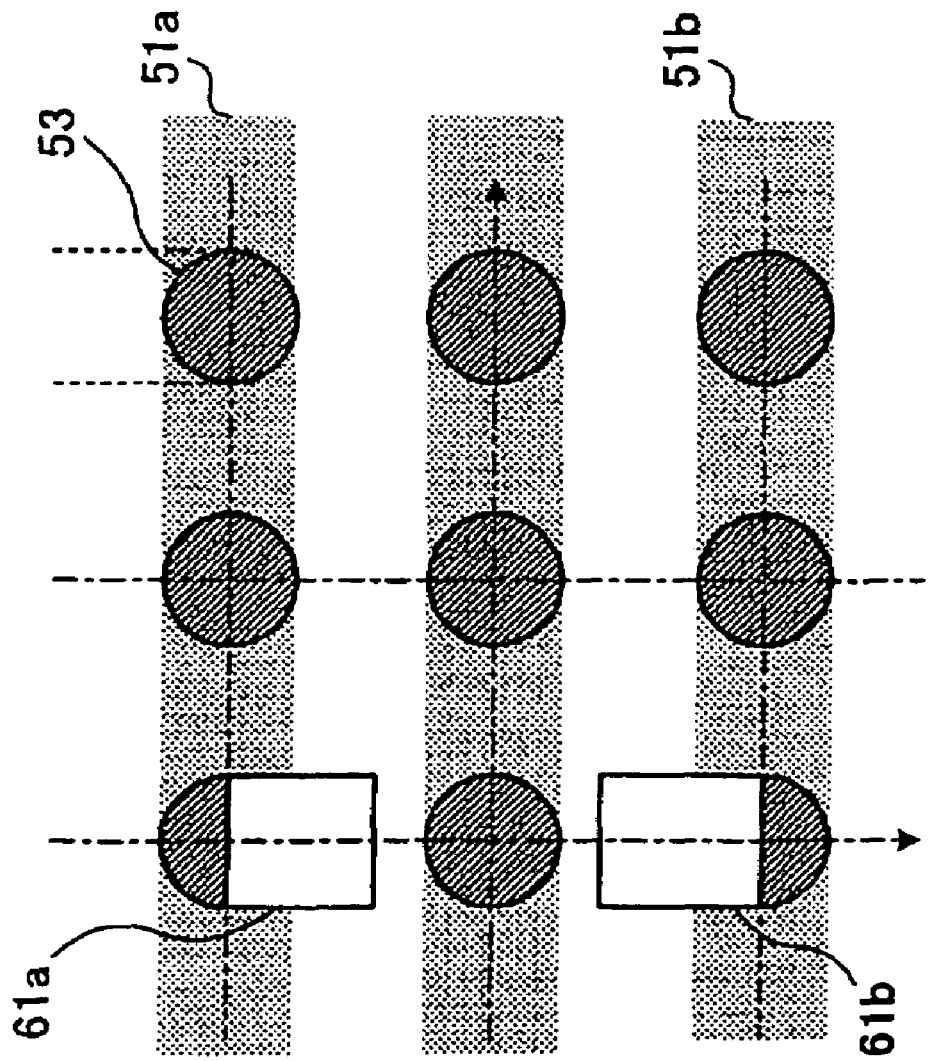
FIG. 6 shows an example of locations of reading heads in the case where the servo control method according to the embodiment is used.
Figure 7:
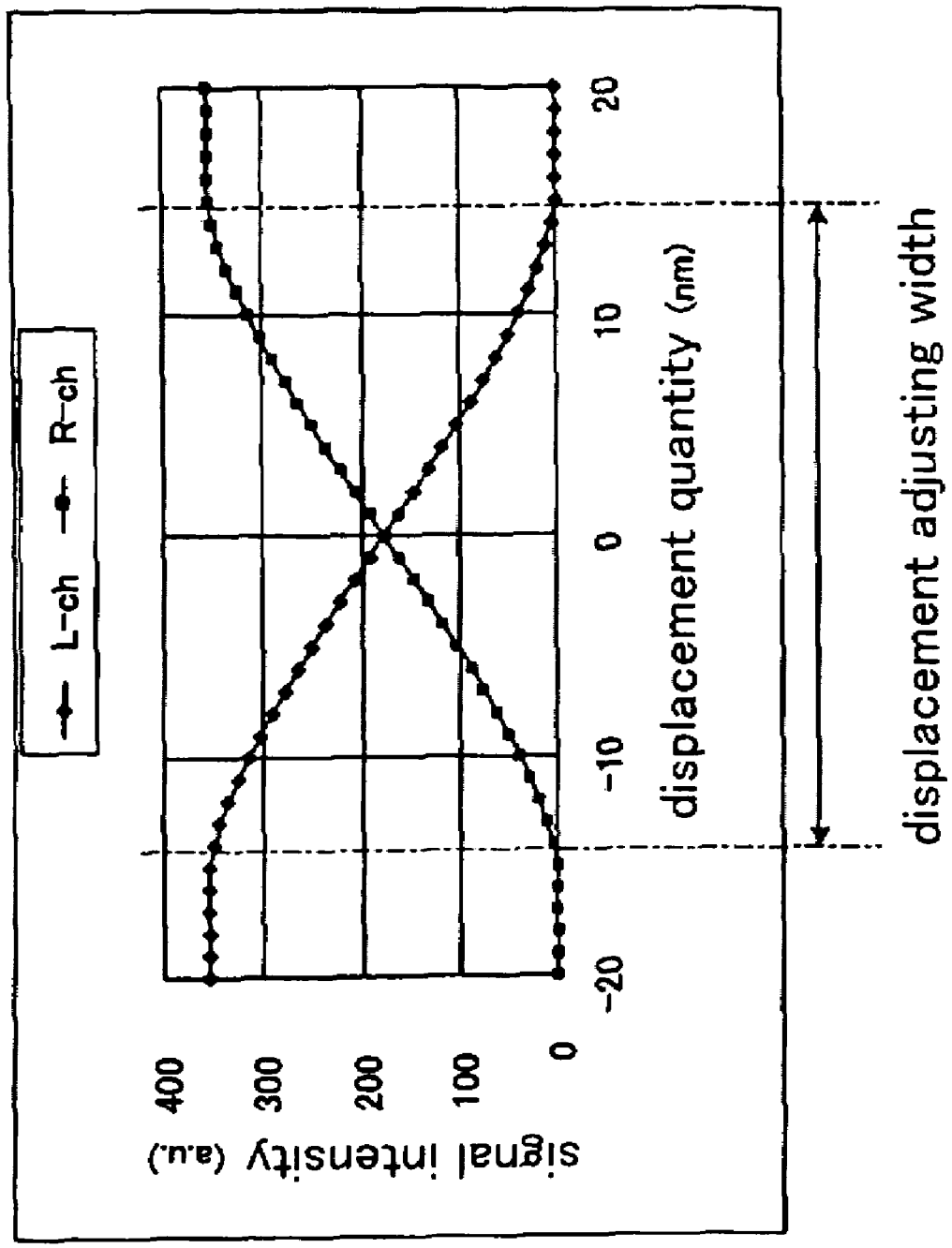
FIG. 7 shows a displacement adjusting width in the case where the servo control method according to the embodiment is used.

FIG. 6 shows an example in which the servo control method according to the embodiment is applied to a magnetic disk device having a patterned medium shown in FIG. 4. In this case, as shown in FIG. 7, reading heads 61a and 61b can read servo signals from servo track 51a and 51b unless the displacement quantity of the head portion exceeds 15 nm which is the radius of the magnetic domain particle 53. The displacement adjusting width is ±15 nm which is larger than that in the case of the servo control method according to the background art.

Figure 8:
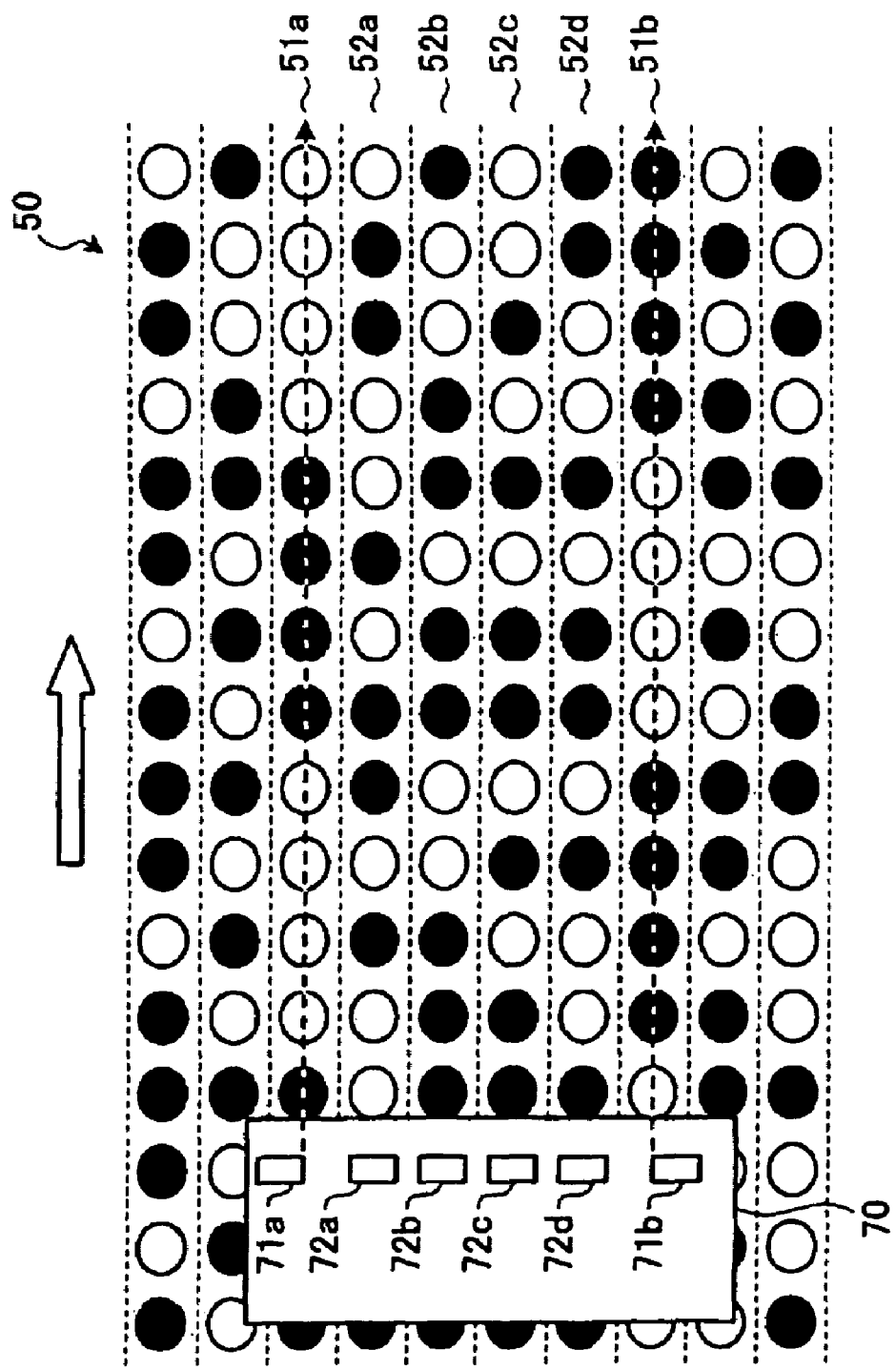
FIG. 8 shows an example in which reading heads dedicated for servo track reading are provided.

Although FIG. 1 shows an example in which the reading heads 61a and 61b read data signals and servo signals, configuration can be made similarly to a head portion 70 in FIG. 8 so that reading heads 72a to 72d read data signals only and reading heads 71a and 71b read servo signals only. Also in this case, servo control based on the intensities of the servo signals can be carried out.

Figure 9:
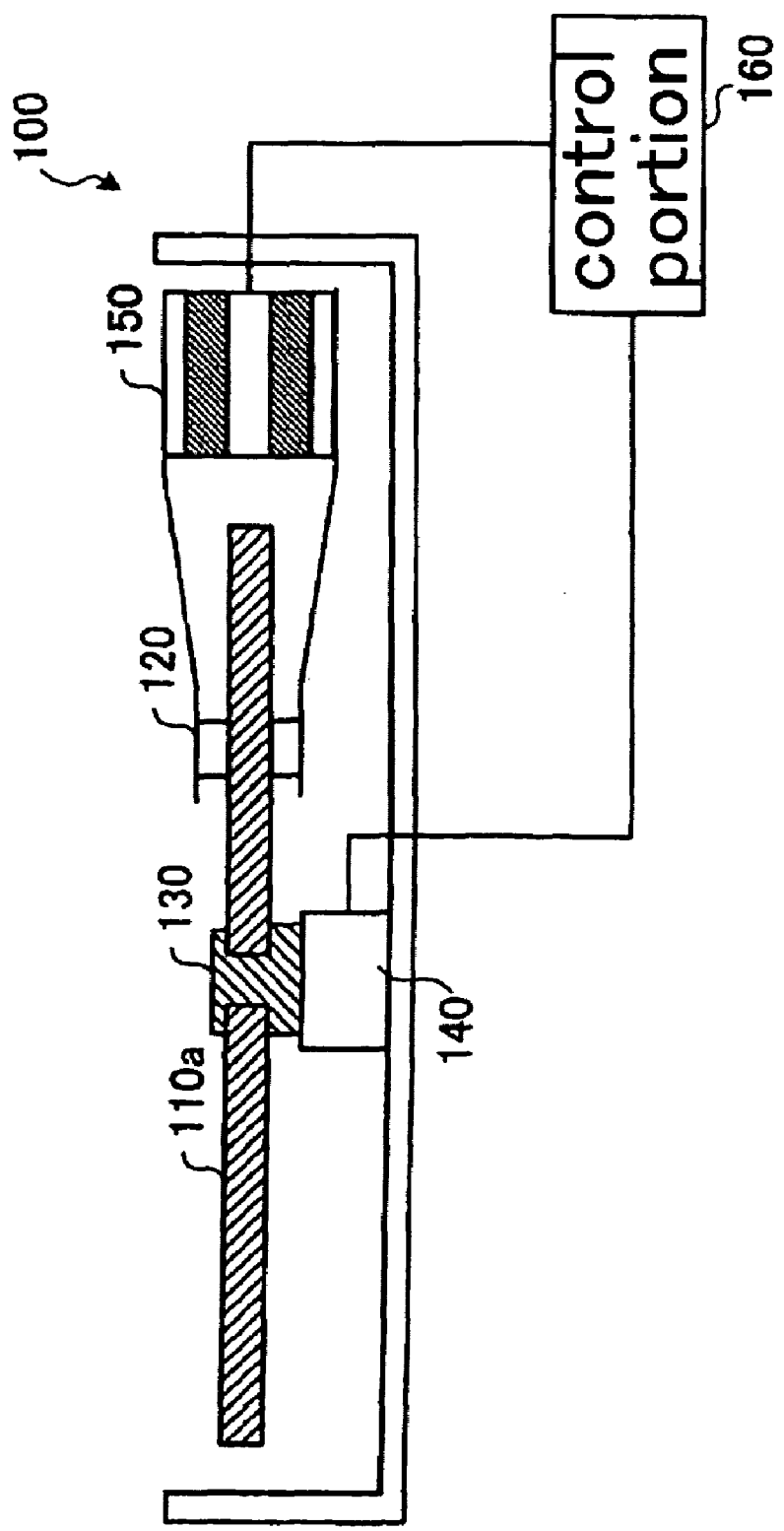
FIG. 9 shows the configuration of a magnetic disk device according to an embodiment of the present invention.

Next, configuration of a magnetic disk device 100 for carrying out the servo control method according to the embodiment will be described. FIG. 9 shows the configuration of the magnetic disk device 100. As shown in FIG. 9, the magnetic disk device 100 has a magnetic recording medium 110a, a head portion 120, a hub 130, a spindle motor 140, a servo drive portion 150 and a control portion 160.

FIG. 9 roughly shows the configuration of the magnetic disk device 100. Practically, these constituent parts of the magnetic recording medium 100 are received in a housing made of aluminum etc. and sealed with a not-shown shield material or top plate attached to the housing, so that the constituent parts of the magnetic disk device 100 are shielded from outside air.

The magnetic recording medium 110a is attached to the spindle motor 140 through the hub 130 so as to be rotated at a predetermined angular speed. A command such as keeping the speed of rotation, start/stop, etc. is issued to the spindle motor 140 by the control portion 160. The servo drive portion 150 follows the command of the control portion 160 so as to load/unload the head portion 120 onto/from the magnetic recording medium 110a or perform a seeking operation toward the inner or outer circumference of the magnetic recording medium 110a.

Figure 10:
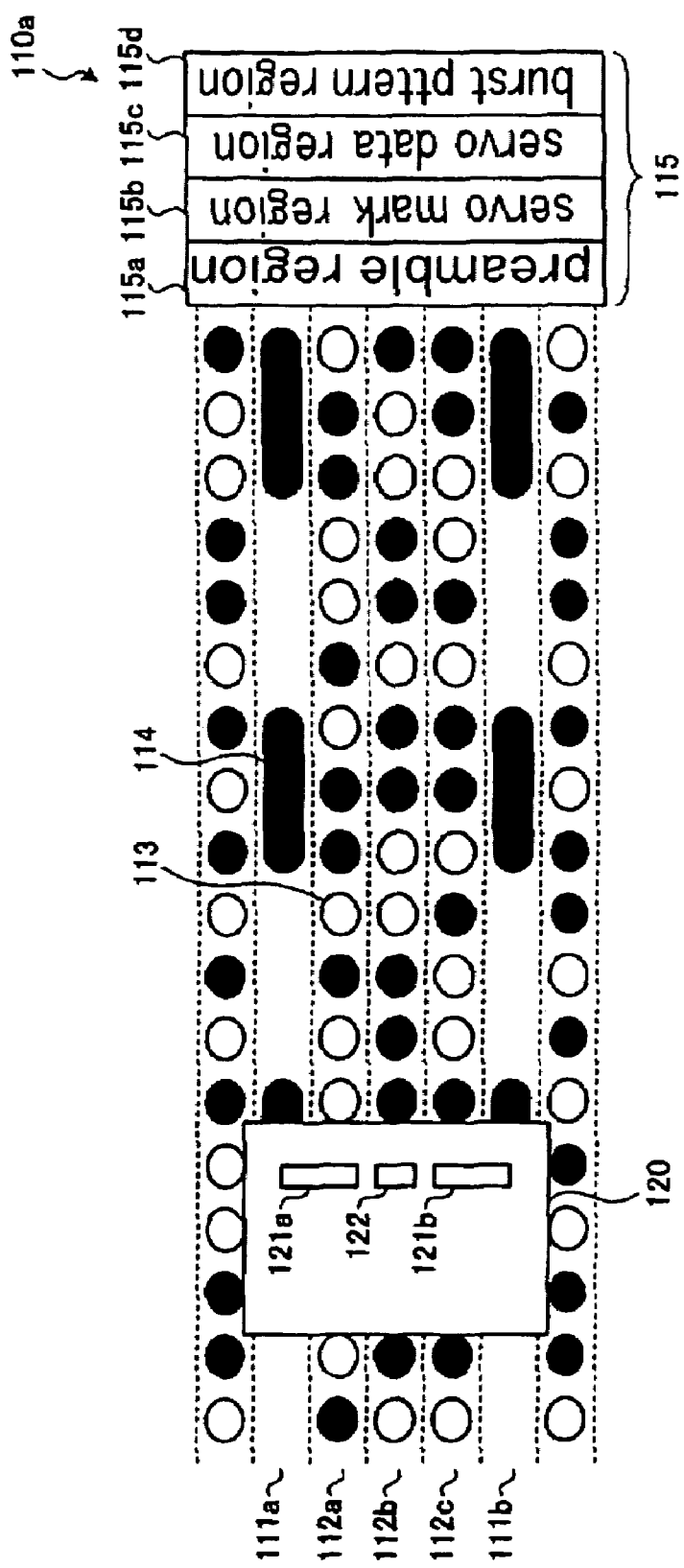
FIG. 10 shows details of a magnetic recording medium and a head portion in the magnetic disk device according to the embodiment.

FIG. 10 shows details of the magnetic recording medium 110a and the head portion 120. As shown in FIG. 10, the magnetic recording medium 110a is a patterned medium, in which data regions are formed by magnetic domain particles arranged in a square lattice pattern and servo tracks such as a servo track 111a are provided for performing consecutive servo.

Similarly to the magnetic recording medium according to the background art, a servo frame 115 including a preamble region 115a, a servo mark region 115b, a servo data region 115c and a burst pattern region 115d is provided perpendicularly to the tracks so that address information etc. of each sector is recorded in the servo frame 115. The servo frame 115 is made of a magnetic material formed into a dot pattern or an elliptically long mark pattern.

In the magnetic disk device 100, the track position of the head portion 120 is controlled based on information read from the servo tracks such as the servo track 111a and information read from the servo frame 115. Specifically, when the head portion 120 passes through the servo frame 115, rough track positioning of the head portion 120 is performed based on track address information and burst pattern information obtained from the servo frame 115. High-accuracy track servo is performed in the data regions in accordance with signals of servo tracks acquired thus.

In the example of FIG. 10, one servo track is provided every three data tracks. For example, an array of data tracks 112a to 112c are placed between servo tracks 111a and 111b. The number of data tracks provided between the servo tracks is arbitrary. When the number of data tracks is changed, the number of reading heads may be changed correspondingly.

Each servo track such as the servo track 111a is formed so that a magnetized magnetic material pattern 114 with a width of bits and a non-magnetic material with the same width as the magnetic material pattern 114 are provided alternately in the track direction. The width of each magnetic material pattern 114 is determined in accordance with the frequency of each servo signal to be reproduced.

To perform servo control with high accuracy, it is necessary to improve accuracy of the servo signals generated from the servo tracks. According to the background art, recording of servo signals into servo tracks is generally performed by a servo writer. Since deviation of the servo writer per se is reflected onto the magnetic recording medium, it is difficult to obtain sufficient accuracy. When a servo signal generating pattern is embedded by patterning as shown in the example of FIG. 10, accuracy of each generated servo signal can be improved by microprocessing using nanoimprint technology etc.

At least one reading head 122 for reading a data signal and reading heads 121a and 121b for reading servo signals and data signals are arranged radially in the head portion 120. The reading head 121a is disposed in such a position that the effective sensitivity region of the reading head 121a covers from one end of the servo track 111a to the center of the servo track 111a. The reading head 121b is disposed in such a position that the effective sensitivity region of the reading head 121b covers from the other end of the servo track 111b to the center of the servo track 111b.

Figure 11:
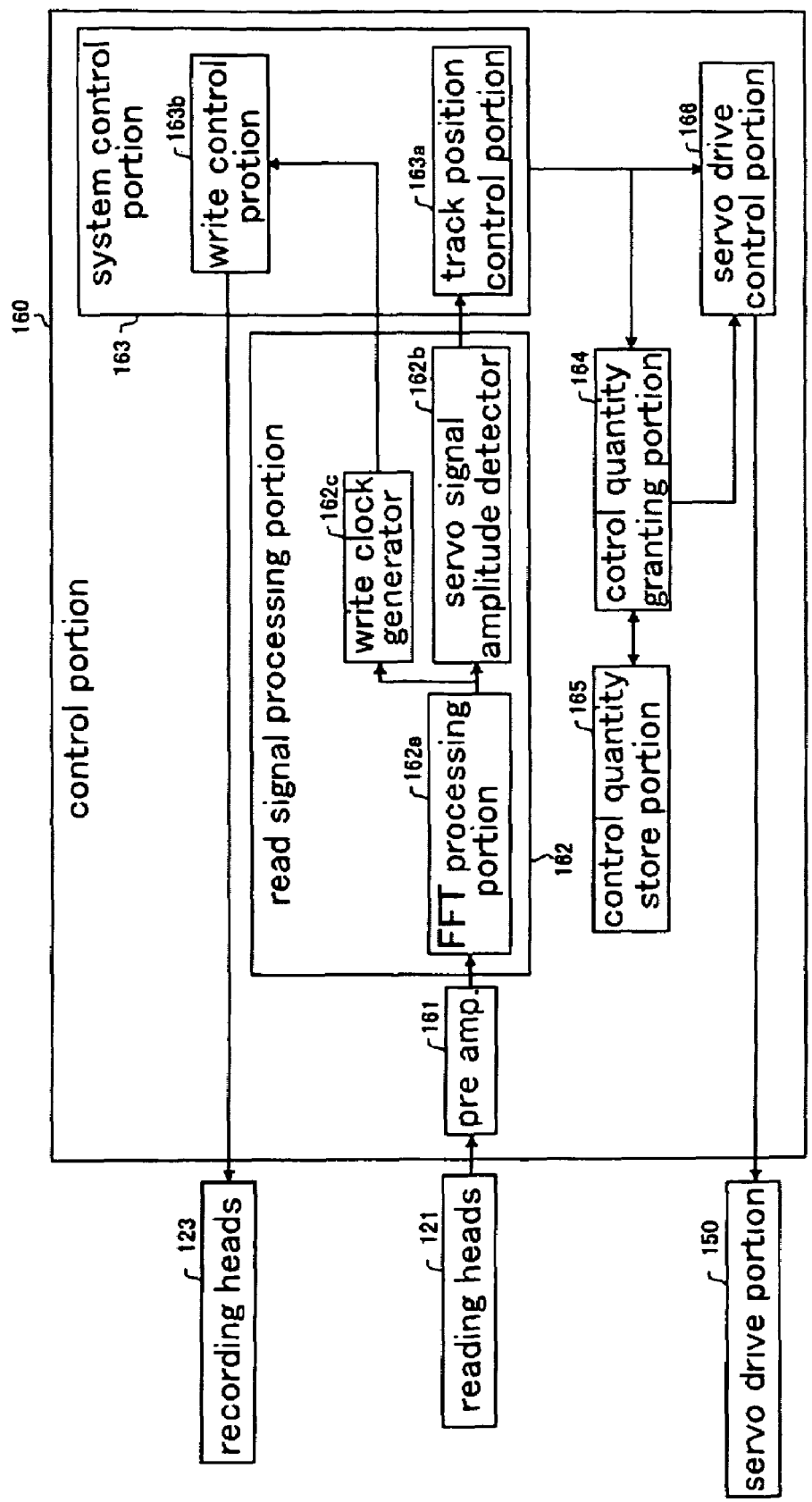
FIG. 11 is a block diagram showing the configuration of a control portion.

Next, details of the control portion 160 are shown in FIG. 11. In order to make description simple, only parts relevant to servo signals read by the reading heads 121a and 121b (hereinafter, these two reading heads will be generically named as "reading head 121") are shown in FIG. 11.

As shown in FIG. 11, the control portion 160 has a preamp 161, a reading head signal processing portion 162, a system control portion 163, a control quantity granting portion 164, a control quantity store portion 165, and a servo drive control portion 166.

The read signal processing portion 162 is a processing portion for processing signals read by the reading head 121. The read signal processing portion 162 has a fast Fourier transform (FFT) processing portion 162a, a servo signal amplitude detector 162b and a write clock generator 162c. The system control portion 163 is a control portion for controlling various operations of the magnetic disk device 100. The system control portion 163 has a track position control portion 163a and a write control portion 163b.

Signals read by the reading head 121 are amplified by the preamp 161. Then, each of the signals is inputted to the FFT processing portion 162a to be separated into a servo signal which is a low-frequency component and a data signal which is a high-frequency component by FFT processing. The servo signal amplitude detector 162b detects amplitudes of the two separated servo signals and compares the intensities of the two separated servo signals.

The track position control portion 163a generates track position control information based on a thus obtained difference between the intensities of the servo signals. The control quantity granting portion 164 refers to the control quantity store portion 165 storing correspondence between the track position control information and the control quantity to be granted to the servo drive portion 150 for correcting displacement of the head portion 120, so that the control quantity granting portion 164 acquires the control quantity corresponding to the generated track position control information. The servo drive control portion 166 adds the control quantity to the servo drive portion 150.

The servo signals separated in the FFT processing portion 162a are also inputted to the write clock generator 162c. The write clock generator 162c is a processing portion for generating write clocks based on the servo signals. The write clocks generated in the write clock generator 162c are used when the write control portion 163b controls timings of a write operation in recording heads 123. In the embodiment, in order to make description simple, illustration of the recording heads 123 is omitted in FIG. 10 etc. The recording heads 123 are equal in number to the reading heads for reading data signals and contained in the head portion 120 so that the recording heads 123 can perform write processing in parallel.

Since the magnetic domain particles are disposed discretely in the track direction in the patterned medium, there is necessity of accurately controlling timing of a write operation. When the write clock generator 162c generates the write clocks based on the servo signals, timing control can be performed in accordance with various conditions of the magnetic recording medium so that a write operation can be performed stably.

Figure 12:
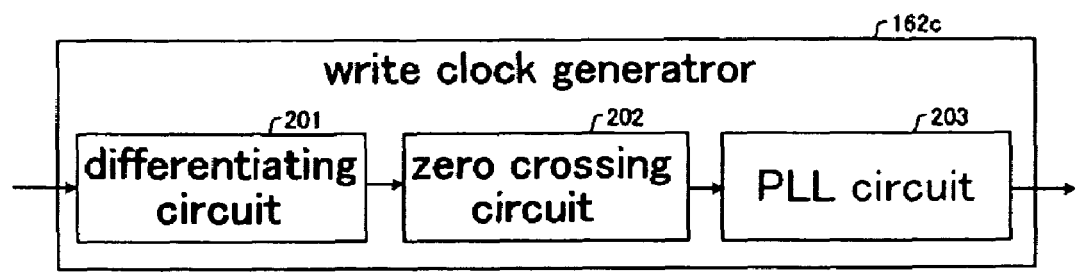
FIG. 12 is a block diagram showing the configuration of a write clock generating portion.

An example of the configuration of the write clock generator 162c is shown in FIG. 12. As shown in FIG. 12, the write clock generator 162c has a differentiating circuit 201, a zero crossing circuit 202 and a PLL (Phase Locked Loop) circuit 203. The servo signals inputted to the write clock generator 162c are transformed into pulse waves by the differentiating circuit 201 and the zero crossing circuit 202, divided in the PLL circuit 203, and outputted as write clocks.

Since the write clocks are generated thus based on the servo signals, frequencies of the servo signals should be frequencies from which high signal frequencies equivalent to required write clocks can be acquired by division.

Figure 13:
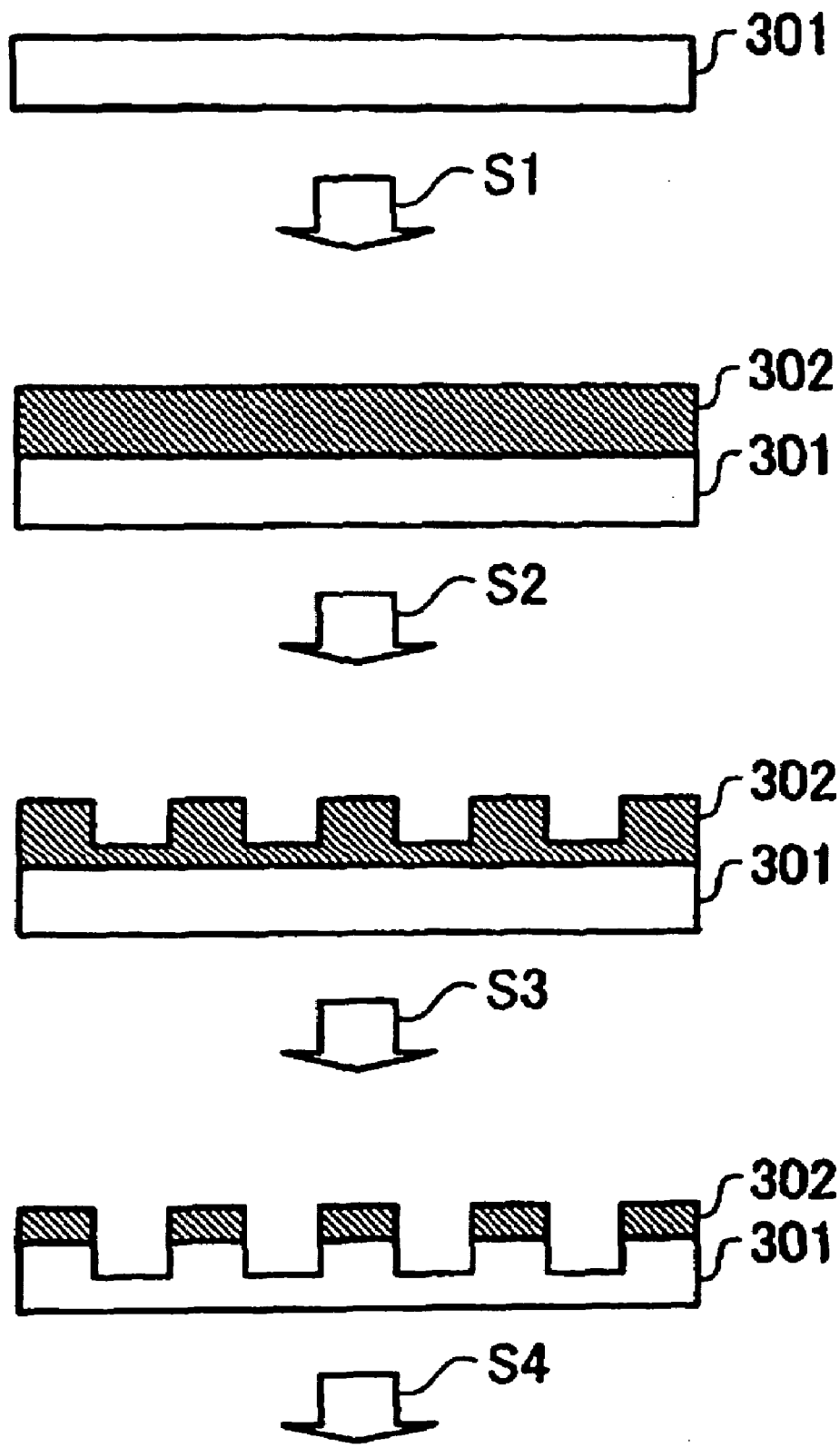
FIG. 13 is a view showing a process for manufacturing the magnetic recording medium.

Next, a method for manufacturing the magnetic recording medium 110a shown in FIG. 10 will be described. An example of a manufacturing method using nanoimprint technology will be described with reference to FIG. 13. First, a resin film 302 is formed on the surface of a magnetic recording medium 301 applied in advance with a strong magnetic field (Step S1). A mold is pressed against the resin film 302 so that the shape of the mold is transferred onto the resin film 302 (Step 2).

Then, an etching process is performed on the resin film 302 from above so as to cut the surface of the resin film 302 (Step 3). On this condition, the magnetic recording medium 301 in the portions where the thickness of the resin film 302 is thin at the time of transferring the mold is eroded so that recesses are formed in the magnetic recording medium 301. The resin film 302 is removed from the magnetic recording medium 301 and the formed recesses are filled with a non-magnetic material 303 made of SiO2 etc. Thus, a magnetic recording medium 110a is produced (Step 4).

According to this manufacturing method, magnetic material patterns 114 of servo tracks are magnetized in the stage that the magnetic recording medium 301 is applied with a strong magnetic field, so that it is not necessary to perform write processing so as to initialize each servo track. For this reason, time required for the format in the process of manufacturing the magnetic recording medium 110a is shortened to thereby contribute to cost reduction.

Figure 14:
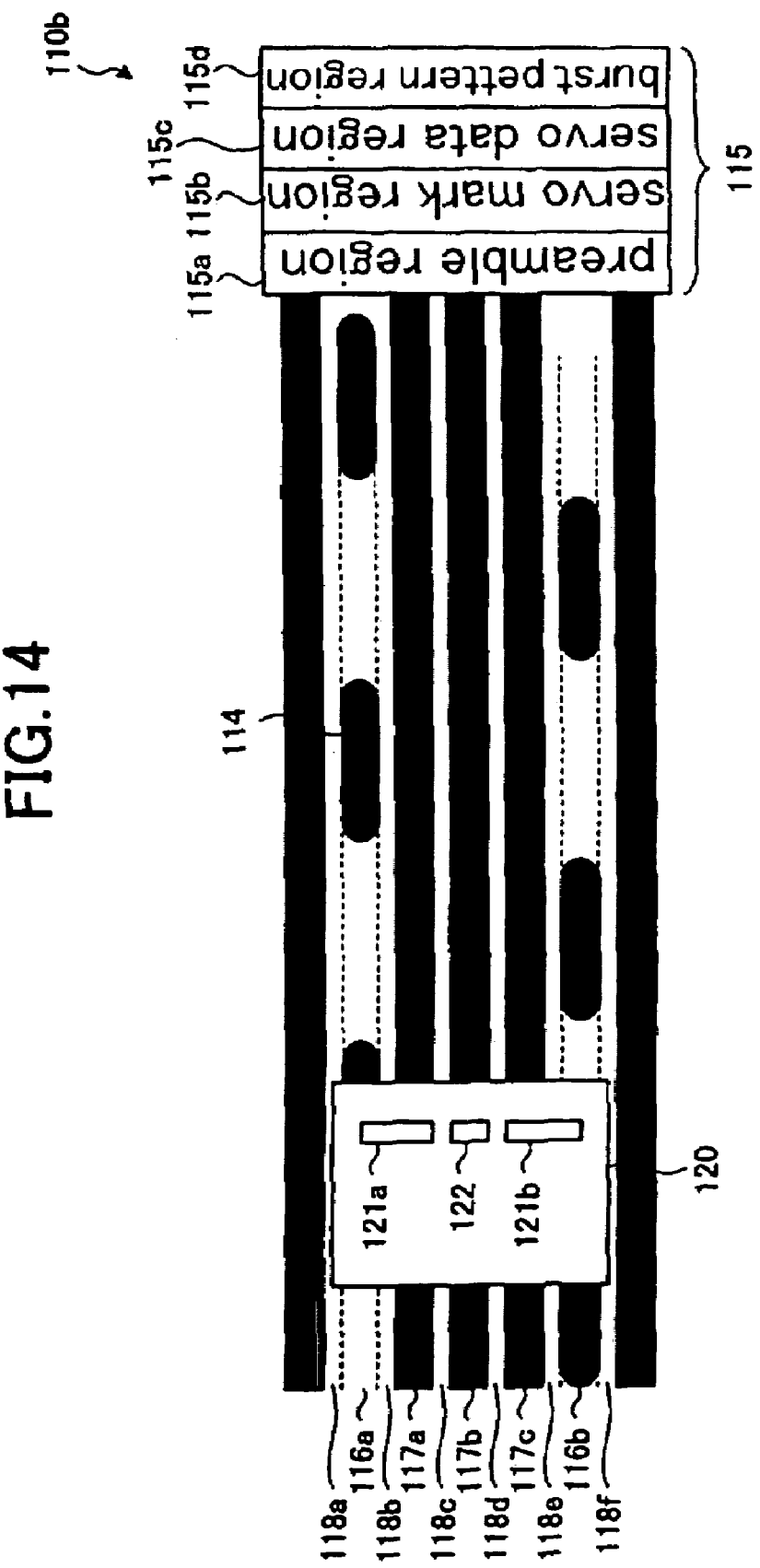
FIG. 14 shows an example where the magnetic recording medium is a discrete track medium.

The servo control method according to the embodiment is also effective in the case where the magnetic recording medium 110a formed as a constituent part of the magnetic disk device 100 is replaced with a medium other than the patterned medium. FIG. 14 shows the case where the magnetic recording medium 110a is replaced with a discrete track medium by way of example.

As shown in FIG. 14, one servo track is provided every three data tracks in a magnetic recording medium 110b made of a discrete track medium. For example, a combination of data tracks 117a to 117c are placed between servo tracks 116a and 116b. The number of data tracks provided between the servo tracks is arbitrary. When the number of data tracks is changed, the number of reading heads may be changed correspondingly.

Each of the servo tracks 116a and 116b and the data tracks 117a to 117c is separated from an adjacent track by grooves 118a to 118f which are made of a non-magnetic material, to be thereby not affected by the magnetic field of the adjacent track.

Even when the magnetic recording medium 110a is replaced thus with the magnetic recording medium 110b, servo control can be performed based on intensities of servo signals read by the reading heads 121a and 121b as described above. The magnetic recording medium 101b can be produced by the manufacturing method shown in FIG. 13.

When the magnetic recording medium 110a is replaced with a medium other than the patterned medium, provision of the write clock generator 162c becomes unnecessary. Although FIG. 14 shows the example in which positions of magnetic material patterns 114 are changed in accordance with servo tracks so that phases of servo signals read from the servo tracks 116a and 116b are reverse to each other, the magnetic material patterns 114 may be disposed so that the phases of the read servo signals are the same as shown in the example of FIG. 10.

As described above, in the embodiment, an array of reading heads is arranged and servo control is performed in accordance with servo signals read from servo tracks by the reading heads on opposite ends of the array, so that the number of data tracks formed between the servo tracks can be increased easily while stable servo control using the servo tracks is achieved. Accordingly, transmission speed of data and efficiency of use of the magnetic recording medium can be improved.

In the embodiment, the reading heads for reading servo signals also read data signals. Thus, the number of required reading heads can be reduced so that manufacturing cost can be reduced.

In the embodiment, configuration is made so that the direction and quantity of displacement of the head portion are measured by comparing intensities of servo signals read by two reading heads. Accordingly, high positioning accuracy can be obtained by a simple structure.

As described above, the magnetic disk device and the magnetic recording medium according to the present invention are useful in performing servo control based on servo signals read from servo tracks. The magnetic disk device and the magnetic recording medium are particularly applied to the case where it is necessary to inexpensively efficiently achieve stable servo control using servo tracks and increase of transmission speed due to parallel reading of data tracks.

What is claimed is:

1. A magnetic disk device comprising:
    a magnetic recording medium in which one servo track and an array of at least two data tracks are formed alternately;
    a head portion including a set of reading heads arranged in a radius direction of said magnetic recording medium for reading signals from said magnetic recording medium; and
    a controller controlling a position of said head portion based on servo signals read from the one servo track and a second servo track on the other side of the array of data tracks, the servo tracks being read by the reading heads disposed at opposite ends of the set,
    wherein a pitch between the reading heads disposed at the opposite ends is narrower than a pitch between the servo tracks, and
    the reading heads disposed at the opposite ends are disposed so that an effective sensitivity region of one of the outermost reading heads reaches the center of the one servo track while an effective sensitivity region of the other outermost reading head reaches the center of the second servo track.

2. The magnetic disk device according to claim 1, wherein the controller measures a direction and a quantity of displacement of the head portion by comparing intensities of the servo signals read respectively by the reading heads disposed at the opposite ends of the set.

3. The magnetic disk device according to claim 1, wherein the reading heads disposed at the opposite ends read data signals from the data tracks while reading the servo signals from the servo tracks.

4. The magnetic disk device according to claim 1, wherein servo signals are recorded with one single frequency in all the servo tracks.

5. The magnetic disk device according to claim 1, wherein the controller generates signals for controlling an operation of write into said magnetic recording medium, from the servo signals.

6. The magnetic disk device according to claim 1, wherein:
    the servo signals are recorded in said magnetic recording medium so as to be read by a lower frequency than the data signals; and
    said controller extracts the servo signals by bandwidth separation from signals read by the reading heads disposed at the opposite ends of the set.

* * * * *